US 6,628,021 B2

(12) United States Patent
Shinohara et al.

(10) Patent No.: US 6,628,021 B2
(45) Date of Patent: Sep. 30, 2003

(54) HYBRID VEHICLE DRIVING APPARATUS ELECTRICAL MOTOR HAVING MAGNETIC FLUX LEAKAGE SHIELDED POSITION SENSOR

(75) Inventors: Keiichi Shinohara, Anjo (JP); Yasuo Yamaguchi, Anjo (JP); Kenichiro Nomura, Anjo (JP); Satoru Wakuta, Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 09/736,184

(22) Filed: Dec. 15, 2000

(65) Prior Publication Data

US 2001/0013731 A1 Aug. 16, 2001

(30) Foreign Application Priority Data

Dec. 17, 1999 (JP) .............................. 11-359987
Jun. 8, 2000 (JP) ........................ 2000-172492

(51) Int. Cl.⁷ .......................... H02K 11/00; H02K 7/09
(52) U.S. Cl. ................... 310/68 B; 310/68 R; 310/90.5
(58) Field of Search .............. 310/68 B, 68 R, 310/40 R, 10, 90.5, 90, 66

(56) References Cited

U.S. PATENT DOCUMENTS

| 3,877,761 A | * | 4/1975 | Boden et al. ............... 310/90.5 |
| 3,929,390 A | * | 12/1975 | Simpson ...................... 310/90.5 |
| 3,976,339 A | * | 8/1976 | Sabnis ........................ 310/90.5 |
| 4,620,752 A | * | 11/1986 | Fremerey et al. .......... 310/90.5 |
| 4,717,977 A | * | 1/1988 | Brown ........................ 360/135 |
| 4,739,427 A | * | 4/1988 | Kilmer et al. ............. 360/98.07 |
| 4,743,995 A | * | 5/1988 | Castle et al. ................. 360/137 |
| 4,779,165 A | * | 10/1988 | Elsaesser et al. ....... 310/156.05 |
| 4,814,652 A | * | 3/1989 | Wright ...................... 310/67 R |
| 4,818,907 A | * | 4/1989 | Shirotori .................... 310/67 R |
| 4,843,500 A | * | 6/1989 | Elsasser et al. ......... 310/156.05 |
| 4,928,029 A | * | 5/1990 | Wright ........................ 29/596 |
| 4,943,748 A | * | 7/1990 | Shiozawa .................... 310/268 |
| 5,148,338 A | * | 9/1992 | Fruge ...................... 360/97.02 |
| 5,408,894 A | * | 4/1995 | Henson ..................... 73/866.5 |
| 5,444,369 A | * | 8/1995 | Luetzow ..................... 123/376 |
| 5,877,568 A | * | 3/1999 | Maes et al. ................ 310/68 B |
| 5,879,785 A | * | 3/1999 | Shin ........................ 428/209 |
| 6,116,364 A | * | 9/2000 | Taguchi et al. ............. 180/165 |
| 6,225,715 B1 | * | 5/2001 | Hoda et al. ................ 310/67 R |
| 6,291,914 B1 | * | 9/2001 | Mukaiyama ............... 310/68 B |
| 6,354,162 B1 | * | 3/2002 | Bobay et al. ............. 310/68 B |
| 6,373,241 B1 | * | 4/2002 | Weber et al. ............. 310/68 B |
| 6,429,560 B1 | * | 8/2002 | Oelsch ......................... 310/90 |
| 6,481,517 B1 | * | 11/2002 | Kobayashi et al. ........ 180/65.3 |
| 6,510,750 B2 | * | 1/2003 | Schlabach et al. ...... 73/862.325 |
| 6,510,835 B1 | * | 1/2003 | Mizuno et al. ............. 123/295 |

FOREIGN PATENT DOCUMENTS

| JP | 02104975 | * | 4/1990 |
| JP | 2001251800 | * | 9/2001 |

* cited by examiner

Primary Examiner—Nestor Ramirez
Assistant Examiner—Pedro J. Cuevas
(74) Attorney, Agent, or Firm—Lorusso, Loud & Kelly

(57) ABSTRACT

A motor 12 includes a cylindrical rotor 20, a stator 19 arranged at a predetermined distance from an outer periphery of the rotor 20, and a position sensor 23 for detecting a rotational position of the rotor 20, wherein the stator 19 includes a stator core 19a and a plurality of stator windings 19b arranged along a circumferential direction of the stator core 19a at substantially equal distances from one another. A shield plate 26 for shielding magnetic flux from the stator windings 19b to the position sensor 23 is mounted against the stator core 19a. Magnetic flux from the stator windings pass through a closed loop starting from the stator windings 19b through the stator core 19a and the shield plate 26 and back to the stator windings to prevent the magnetic flux leakage from the stator windings 19b from flowing to another member. With this arrangement, the magnetic flux leakage from the stator windings does not affect the position sensor (magnetic sensor) which detects the rotational position of the rotor.

19 Claims, 6 Drawing Sheets

HYBRID VEHICLE DRIVING APPARATUS ELECTRICAL MOTOR HAVING MAGNETIC FLUX LEAKAGE SHIELDED POSITION SENSOR

BACKGROUND OF THE INVENTION

1. Field of the Invention

The present invention relates to a motor having a detector or sensor for detecting a rotational position of a rotor, and more particularly, to a motor having a shield structure for preventing magnetic flux leakage from entering the sensor.

2. Description of Related Art

Brushless motors having permanent magnet rotors are used for driving electric automobiles and hybrid vehicles. In this type of brushless motor, a detector or sensor detects the rotational position of the rotor to control the phases of currents applied to stator windings. When a magnetic sensor is used as the position sensor for detecting the rotational position of the rotor, magnetic flux leakage from the motor can adversely affect the detection precision causing the position sensor to be operated improperly and interfering with optimum operation of the motor. Further, since this magnetic flux leakage increases as the current to the motor winding is increased, the adverse influence of the magnetic flux leakage increases as the current increases.

To avoid or reduce the adverse influence of the magnetic flux leakage, the position sensor has sometimes been positioned in a region where the position sensor is not affected by the magnetic flux leakage. However, this generally requires that entire motor including the position sensor be increased in size in order to place the position sensor away from areas where magnetic flux is produced.

Alternatively it is known to avoid or reduce the adverse influence of the magnetic flux leakage by disposing a magnetic shield plate between the motor and the position sensor such as disclosed in Japanese Patent Application Laid-open No. HEI 11-78558. The magnetic shield plate is directly fixed to the motor housing by connecting the magnetic shield plate to the stator core through a mounting member. The prior art magnetic shield plate installed between the motor and the position sensor is still deficient in preventing increases in stray magnetic flux from causing flux changes in the position sensor when the stator current is increased. Therefore, in order to prevent stator flux changes from affecting the position sensor, it is necessary to increase the distance between the motor and the magnetic shield plate or between the magnetic shield plate and the position sensor. Thus, the entire motor including the position sensor is increased in size also in the case of employment of a magnetic shield.

SUMMARY OF THE INVENTION

The present invention has been achieved to solve these problems, and it is an object of the invention to provide a small motor in which magnetic flux leakage from a stator winding does not adversely affect a position sensor (magnetic sensor) which detects rotational position of a rotor.

It has been discovered that when the mounting member for a shield plate is a member having low relative permeability such as aluminum as in the prior art, a magnetic gap between the stator core and the shield plate results in magnetic leakage flux from the stator winding flowing from the magnetic shield plate toward other members producing the likelihood of magnetic leakage flux adversely affecting the position sensor.

According to one aspect of the invention, a motor includes a cylindrical rotor, a stator arranged at a predetermined distance from an outer periphery of the rotor and having a stator core and a plurality of stator windings arranged along a circumferential direction of the stator core at substantially equal distances from one another, a position sensor for detecting a rotational position of the rotor, and a shield member directly mounted against the stator core for shielding magnetic flux from the stator windings to the position sensor. Leakage magnetic flux generated by the stator windings passes in a closed loop including the shield member and the stator core thereby preventing the leakage magnetic flux in such closed loop from flowing from a gap between the shield member and the stator core to another member affecting the position sensor. Therefore, an error or detection failure of the position sensor due to the magnetic flux leakage is prevented.

According to a preferred form, the shield member is disposed so as to extend around the stator windings on all sides facing position sensing and indicating members. Therefore, it is possible to reliably contain leakage magnetic flux from the stator windings to closed loops to reduce the effect of stator winding magnetic flux leakage on position sensing.

According to another preferred form, the position sensor is a magnetic sensor, and the position sensor is disposed close to the outer periphery of the stator windings in a radial direction thereof. Therefore, an axial size of the motor with the position sensor can be shortened to make the motor more compact and the position sensor is less prone to be affected by the magnetic flux leakage from the stator winding.

According to still another preferred form, the position sensor detects the rotational position of the rotor through a position indicating member extending integrally from the rotor toward its outer periphery in the radial direction thereof By disposing the position indicating member close to the position sensor, the rotational position of the rotor can be accurately detected.

According to further preferred form, the position indicating member extends toward a radially outer peripheral side from the rotor on a side of the shield member axially opposite to the stator windings. Therefore, magnetic leakage flux coming from the stator windings is prevented by the shield plate from flowing to the position indicating member.

According to a still further preferred form, the position indicating member is a plate which at its periphery is bent axially over an outer peripheral side of the shield member and the stator windings and which has a plurality of detection teeth formed on the bent portion along a circumferential direction thereof opposing the position sensor detecting detection teeth to detect the rotational position of the rotor. Therefore, the stator winding leakage magnetic flux is prevented from flowing through the position indicating member disposed in the vicinity of the stator windings, and the motor can be made compact.

According to another preferred form, the stator core and the shield member or plate are integrally fastened to a motor housing which accommodates the rotor and the stator. Therefore, it is unnecessary to fix the stator core and the shield plate using another member, whereby the number of parts is reduced, and the motor can be made compact.

According to still another preferred form, the shield plate extends from the stator core along a peripheral side of the stator windings on a radially outer side of the motor in an axial direction away from the stator core, and extends radially inward over the stator windings up to a radially inner side of the stator windings. Accordingly, the magnetic flux leakage from the stator winding can reliably be blocked, since the shield member covers an outer peripheral side of the stator windings and a lateral side of the stator windings axially opposite the stator.

According to yet another preferred form, the portion of the shield plate located on the radially inner side of the stator windings extends axially toward the stator core. Therefore, a gap between the stator core and a radially inner edge of the shield plate is shortened, and magnetic flux leakage from the stator windings can be prevented from leaking to another member.

According to another preferred embodiment, the shield member extends from the stator core axially over an outer peripheral side of the stator windings, and then extends radially inward over a lateral side of the stator windings and over a lateral side portion of the rotor. Therefore, it is possible to shield the position sensing elements from both the magnetic flux leakage from the stator windings and the magnetic flux leakage from the rotor.

According to another preferred form, the shield member is formed from a ferromagnetic material. Therefore, it is possible to prevent the magnetic flux leakage from flowing to another member.

According to another preferred form, a distance between the stator core and the shield member is set shorter than a distance between the stator core and a position indicating member or plate. Therefore, it is possible to reliably flow magnetic flux coming from the stator core toward the shield member, to form the closed loop of the magnetic flux, and to prevent the magnetic flux from flowing to the position indicating member.

According to another preferred form, a non-magnetic heat conductive member is filled between the stator core, the stator windings and the shield member. The shield effect of the magnetic flux leakage can be maintained, and the heat of the stator winding can be transmitted to the stator core, the housing, and the like through the heat conductive member to enhance the heat radiation ability.

According to still another preferred form, the motor is applied to a hybrid vehicle driving apparatus. Accordingly, it is possible to obtain a compact hybrid vehicle having simple structure and high performance.

According to the present invention, the shield member mounted against the stator core is disposed between the stator windings and the position sensor such that any magnetic circuit followed by magnetic flux leakage from the stator windings on a side of the position sensor passes from the shield member to the stator core without any substantial gap. Therefore, the magnetic flux leakage from the stator windings is prevented from flowing to the position sensor and thus, the rotational position of the rotor can be detected accurately. In this case, since the shield member is directly mounted to the stator core, a magnetic circuit starting from the stator windings to the stator core through the shield member and back to the stator windings is formed, and the magnetic flux leakage from the stator windings is prevented from flowing to another member. Consequently, the shielding effect by the shield member against the stator winding magnetic flux is increased, and it is possible to increase the current in the stator windings.

Further, since an excellent shielding effect by the shield member can be expected, the position sensor can be disposed in the vicinity of the stator, and the distance between the stator winding and the shield member, or between the shield member and the position sensor can be shortened. That is, even if heavy current is applied to the stator windings, the position sensor can be disposed near the stator and thus, a compact motor can be obtained. Therefore, the shielding effect is enhanced as compared with a case in which a shield member not magnetically connected to the stator core is mounted.

DETAILED DESCRIPTION OF THE PREFERRED EMBODIMENT

Figure 1:
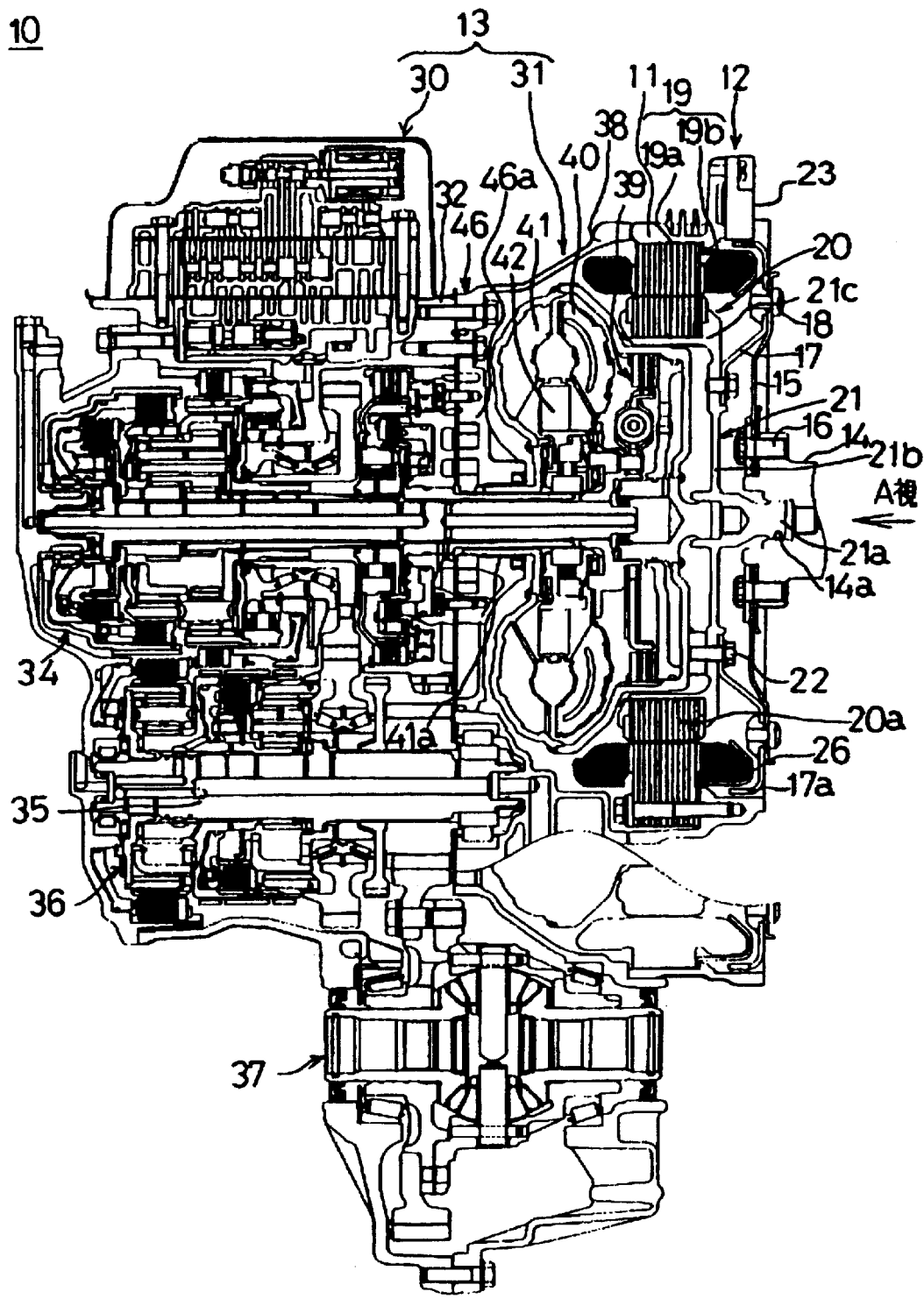
FIG. 1 is a sectional view of one embodiment of an entire motor in accordance with the present invention as incorporated in a hybrid vehicle driving apparatus.

One embodiment of the present invention is a motor, as shown in FIGS. 1 through 4, employed in a hybrid vehicle. A hybrid vehicle driving apparatus 10 includes a motor 12 added to a torque converter portion 31 of a conventional automatic transmission (AT) 13. In the hybrid vehicle driving apparatus 10, an internal combustion engine (not shown, located on the right side in FIG. 1), a motor 12 accommodated in a motor housing 11, and an automatic transmission 13 to which driving force from the engine and the motor 12 is transmitted are disposed in this order from the internal combustion engine side. In this embodiment, the motor 12 is a motor-generator that can be used both as a motor and a generator, is a motor that can be used only as a driving apparatus, or is a generator that can be used only as an electric generator.

An engine crankshaft 14 extends toward the motor 12 from the internal combustion engine side. A flexible drive plate 15 is fixed to an end of the engine crankshaft 14 by bolts 16. An input plate 17 (also functioning as a position indicating member for a rotor 20 of the motor) is formed from a magnetic material and is mounted on the motor side near the outer edge of the drive plate 15 each other by bolts 18.

The motor 12 is a brushless DC motor for example. The motor 12 has a rotor 20 with permanent magnets 20b and has a stator 19 arranged at a predetermined distance from an outer periphery of the rotor 20. The stator 19 includes a stator core 19a, and a plurality of stator windings 19b wound around stator poles at substantially equal distances from one another along the circumferential direction of the stator core 19a. This motor 12 obtains torque by magnetic effect between the rotor 20 and the current flowing through the stator windings 19b. This torque is obtained from the magnetic force generated between the rotor 20 and the stator core 19a. The rotational position and rotational speed of the rotor 20 are detected. The current is supplied from a three-phase AC power supply generating phases in accordance with the detected position to generate torque between the rotor 20 and the stator windings 19b, thereby rotating the rotor 20. As the rotor 20 rotates, the detection signals of the rotor position are employed to sequentially switch the current phases applied to the stator windings 19b to maintain the rotation.

The rotor 20 comprises a large number of ferromagnetic laminated plates 20a in which permanent magnets 20b are embedded. The laminated plates 20a are stacked in the axial direction. These laminated plates 20a are fixed to and retained on a rotor supporting plate 21. This rotor supporting plate 21 includes a cylindrical shaft 21a at its center of rotation, a disc 21b continuously connected to the shaft 21a and arranged along the drive plate 15, and a retaining portion 21c continuously connected to an outer periphery of the disc 21b. The laminated plates 20a are fixed to and retained on the retaining portion 21c. The shaft 21a of the rotor supporting plate 21 is inserted into a hole 14a in the end of the engine crankshaft 14 and is axially movably supported therein.

An inner edge of the input plate 17 is fixed to the disc 21b of the rotor supporting plate 21 by bolts 22. The drive plate 15 and the input plate 17 are connected between the rotor 20 and the engine crankshaft 14 of the internal combustion engine for transmitting driving forces between the motor and engine.

The stator 19 includes a large number of ferromagnetic stator core laminations 19a stacked in the axial direction with stator windings 19b wound around stator poles formed thereon. The stator 19 is fixed to the motor housing 11. The rotor plates 20a of the rotor 20 and the stator plates 19a of the stator 19 are concentric, i.e., arranged in the radial direction at the same axial position. The rotor plates 20a and the stator core plates 19a are opposed to each other at a slight distance (air gap) from each other.

Figure 2:
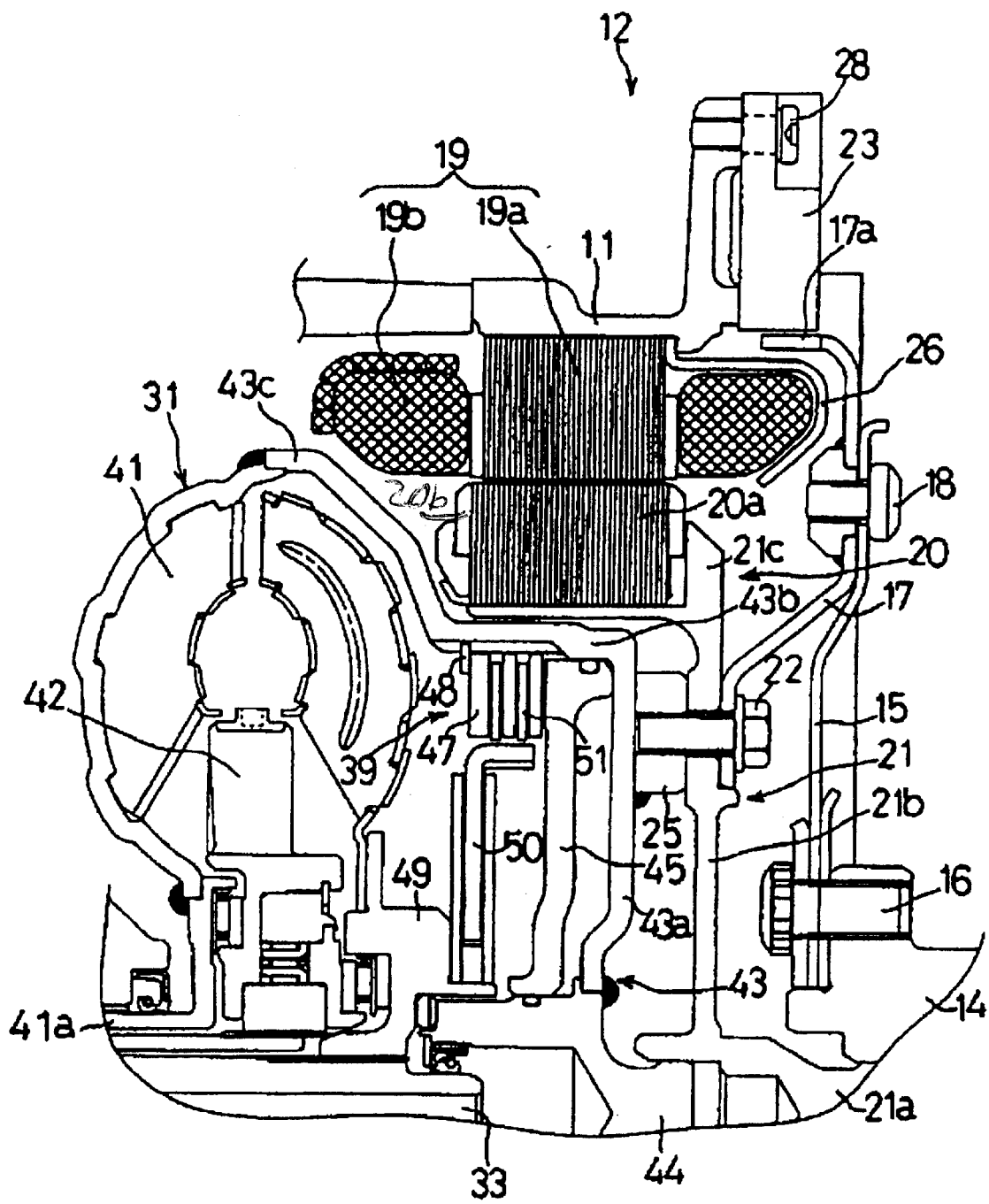
FIG. 2 is an enlarged sectional view of an essential portion of the motor in FIG. 1.

Next, in FIG. 2, the input plate (i.e., position indicating member) 17 is formed from a magnetic material such as iron plate or the like and extends outward in the radial direction on the right side of the stator 19 and then in the axial direction over the periphery of the stator 19. A position sensor 23 comprising a magnetic sensor is disposed at a position where the input plate 17 and the stator windings 19b of the motor 12 are superposed in the radial direction. The axially extended portion of the detection plate 17 is detected by this position sensor 23, and based on this detection, the rotational position and the rotation speed of the rotor 20 can be detected. The position sensor 23 is mounted, by means of a bolt 28, to the motor housing 11 that is disposed on the outer periphery side of the stator windings 19b in its radial direction and adjacent to the internal combustion engine such that the position sensor 23 is oriented vertically in the outward radial direction.

Figure 3:
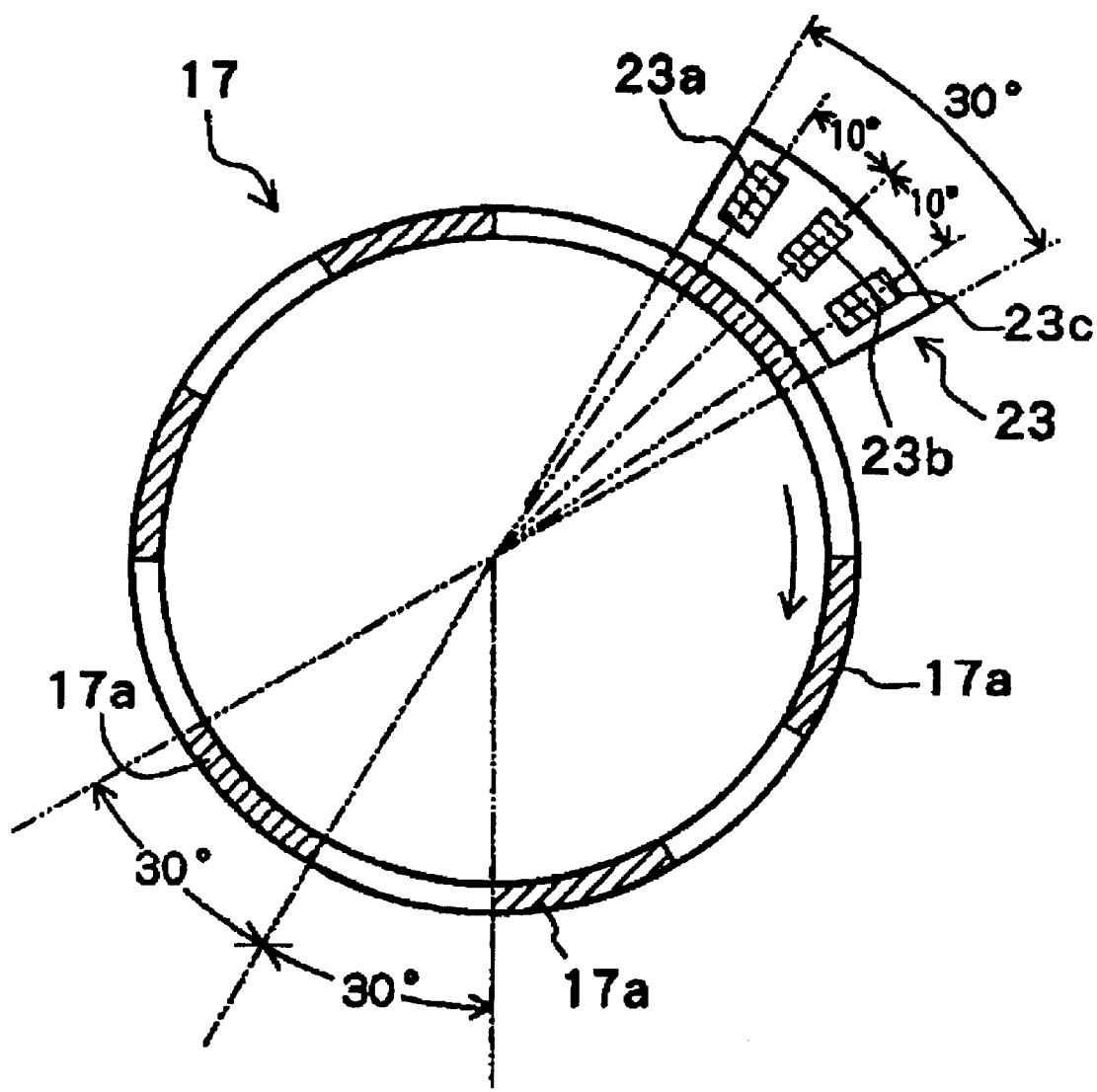
FIG. 3 shows a position sensor and a rotor position indicating member in the motor of FIG. 1.

More specifically, the plate 17 extends in the outward radial direction from the inner edge portion of the plate 17 integrally connected to the disc 21b of the rotor supporting plate 21 by bolts 22. An outer peripheral edge of the detection plate 17 is bent leftward such as to extend axially over the right outer peripheral side of the stator windings 19b as viewed in the drawing. As shown in FIG. 3, the bent portion of the detection plate 17 is formed with a plurality (six, in the embodiment) of detection teeth 17a spaced at substantially equal distances from one another. By detecting the presence or absence of the detection teeth 17a using the position sensor 23, the rotational position of the rotor 20 is accurately detected, and the timing for applying the current to the stator windings 19b is determined. In this case, since the position sensor 23 is oriented vertically, excessive space in the axial direction is not required, and the axial length of the motor and engine can be shortened.

In the present embodiment, as shown in FIG. 3, the magnetic sensor has three sensor portions 23a, 23b and 23c each portion comprising a magnet and a magnetic resistance element to sense the proximity of a tooth 17a. The sensor portions 23a to 23c are disposed at substantially equal distances from one another, i.e., at a 10° angle with respect to a rotation center of the detection plate 17. The detection teeth 17a are disposed at substantially equal distances from one another, i.e., at a 60° angle with respect to a rotation center of the detection plate 17. Therefore, if the rotor 20, i.e., the detection plate 17 rotates clockwise from the position shown in FIG. 3, the absence of a proximate detection tooth 17a is detected sequentially by the sensor portions 23a, 23b and 23c beginning with sensor portion 23c. Accordingly, with this arrangement, the rotational position or phase of the rotor 20 is detected. When a detection tooth 17a approaches any one of the sensor portions, the magnetic flux of the magnet in the sensor portion is attracted by the detection tooth 17a, and the direction of the magnetic flux is changed. The change in the direction of the magnetic flux is sensed by magnetic resistance element to produce a signal from which it is possible to judge the presence or absence of the detection tooth 17a.

When the position of a position indicating member in a motor is detected using a magnetic sensor in the prior art, the intensity of the magnetic field to be detected can be changed by magnetic flux leakage producing the possibility that the direction of the magnetic flux is affected and a detection error is caused. Therefore, it is necessary to prevent externally generated magnetic flux from entering the position sensor 23. In this embodiment, magnetic flux leakage is prevented from entering the position sensor 23 by a magnetic shield plate 26. A resolver or the like may be used as a sensor for detecting the rotational position of the rotor 20, but a resolver includes a rotor and a stator like a motor and the required space for the motor and position sensor is increased correspondingly. Thus, in order to reduce the motor size, the magnetic sensor comprising the magnet and the magnetic resistance element is used in this embodiment.

In the present invention, a shield member 26 for shielding the magnetic flux leakage so as to prevent the magnetic flux leakage from entering the position sensor 23 from the stator windings 19b is mounted to the stator core 19a.

In FIG. 2, an annular or doughnut-shaped shield plate 26 covers the outer peripheral side and the lateral side of the stator windings 19b to extend in a circumferential direction in a gap between the stator winding 19b and the detection plate 17 and between the stator windings 19b and the position sensor 23. The shield plate 26 is directly mounted against a side wall of the stator core 19a. The shield plate 26 is made of ferromagnetic material such as iron plate for shielding magnetic flux leakage generated from the stator winding 19b. The shield plate 26 has an outer rim which is fixed to the motor housing 11 integrally with the stator core 19a. The shield plate 26 extends from the stator core 19a axially over the outer peripheral side of exposed right portions (as viewed in FIG. 2) of the stator windings 19b, and then extends radially inward along the right lateral side of the stator windings to a radially inner side of the stator windings. The radially inner portion of the shield plate 26 is bent toward the stator core 19a to partially cover an inner peripheral portion of the stator windings 19b. For this reason, a distance between the stator core and the shield plate is shorter than a distance between the stator core to the detection plate or the bolt. Magnetic flux leakage from the stator winding 19b forms a closed loop passing through the shield plate 26 and the stator core 19a without any gap between the shield plate 26 and stator core 19a on the outer periphery side adjacent the sensor 23. With this loop, the magnetic flux leakage from the stator winding 19b is prevented from flowing to other members, and the magnetic flux leakage is prevented from affecting the position sensor 23.

The shield plate 26 can be fixed in a manner other than that described above. For example, the shield plate 26 may be welded to the motor housing 11 and brought into direct contact with the stator core 19a, or the stator core 19a may be inserted into the motor housing 11 under pressure to fix the shield plate 26.

Figure 4:
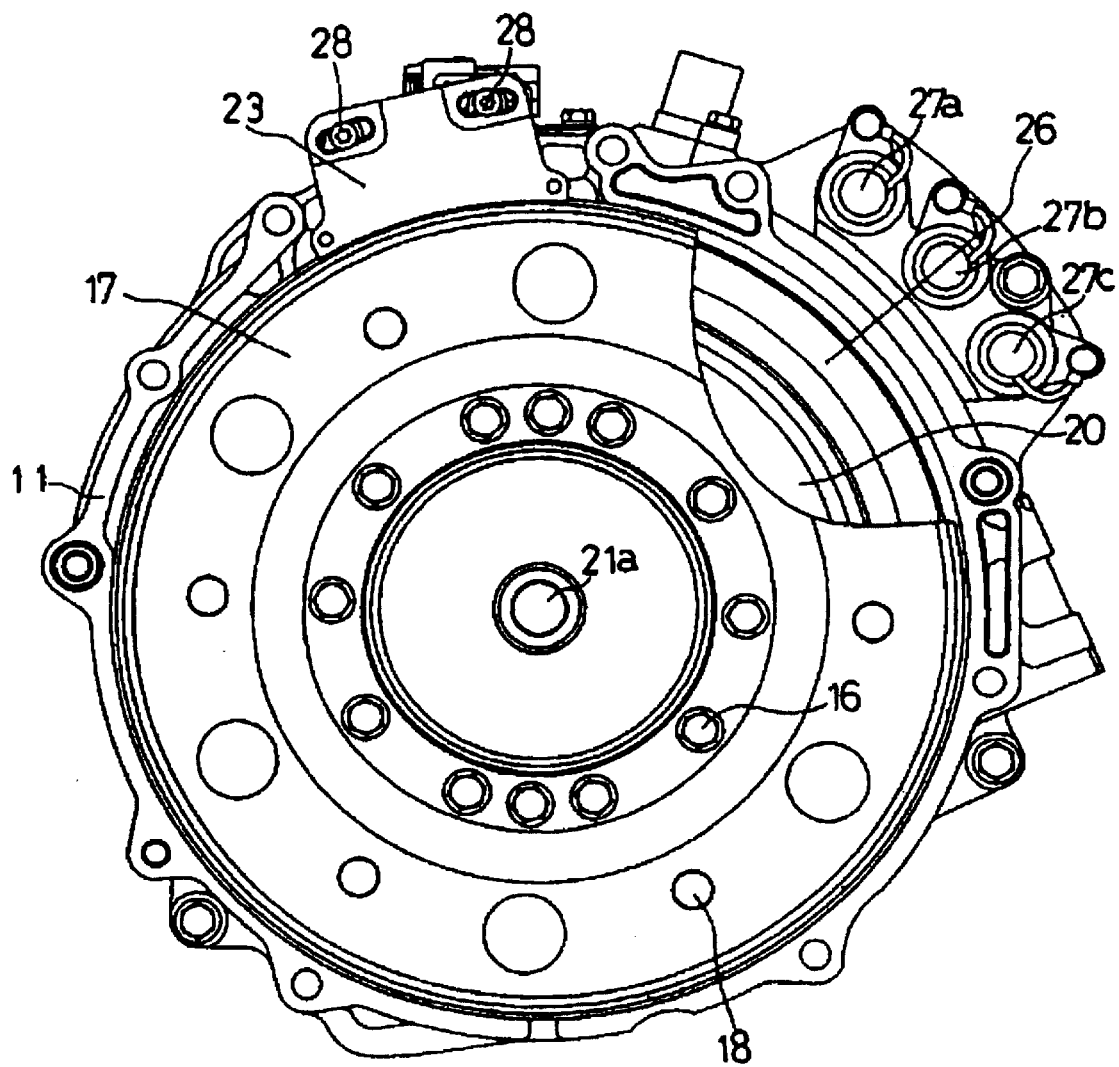
FIG. 4 is a view taken along an arrow A in FIG. 1 with a portion broken away.

FIG. 4 is a front view of the motor 12. An outer edge of the motor housing 11 is provided with terminals 27a to 27c. Three-phase AC voltage is input to the stator windings 19b from the terminals 27a to 27c. The position sensor 23 is fixed to the motor housing 11 by means of two bolts 28 and 28.

Next, the operation of the above-described shield plate 26 will be explained.

In order to drive and control the motor 12 such as a brushless DC motor, it is necessary to detect a rotational position of the rotor 20. In the present embodiment, a magnetic sensor is used as the position sensor 23 for the rotor 20, and the rotational position of the rotor 20 is detected by detecting a position of the detection teeth 17a that is integrally fixed to the rotor 20. That is, as the detection teeth 17a rotate past the sensor 23, current flowing through the sensor portions 23a, 23b and 23c varies in accordance with the presence or absence of the detection teeth 17a in proximity to the sensors 23a, 23b and 23c. Accordingly, with the position sensor 23, the phase of the rotor 20 can be accurately detected based on the variation of the current in the sensor portions 23a, 23b and 23c. In accordance with the detected position of the rotor 20, phased current is generated and supplied from the three-phase AC power source to the corresponding stator windings 19b to generate a rotating magnetic field from the stator 19 to rotate the rotor 20.

However, if magnetic flux leakage from a stator winding 19b of the motor 12 flows into the position sensor 23, the current value output from the position sensor 23 is changed and the rotational position of the detection teeth 17a can not be detected accurately. By disposing the shield plate 26 between the stator winding 19b and the position sensor 23 with the shield plate magnetically connected to the stator core 19a, the stray magnetic flux generated on the outer periphery of the stator winding 19b passes from the stator winding through the shield plate 26 and stator core 19b back to the stator winding in a closed loop. Therefore, magnetic flux leakage from the stator winding 19b does not flow to members other than members constituting the closed loop of the magnetic flux. Thus, more excellent shielding effect can be obtained as compared with a case in which the shield plate 26 is connected to the motor housing 11 made of non-magnetic material such as aluminum and the stator core 19a and the shield plate 26 are not connected magnetically.

According to the present embodiment, since the shielding effect against the magnetic flux leakage is increased by the shield plate 26, the current amount supplied to the stator winding 19b can be increased correspondingly. Since the magnetic flux leakage from the stator windings 19b can completed be shielded magnetically by the shield plate 26 from the sensor 23, the position sensor 23 can be disposed close to the stator winding 19b, and a distance between the stator winding 19b and the shield plate 26, or between the shield plate 26 and the position sensor 23 can be shortened. Therefore, even if higher current is supplied to the stator winding 19b, error in magnetic sensor detection due to a magnetic effect is eliminated, and a compact design can be realized.

Figure 5:
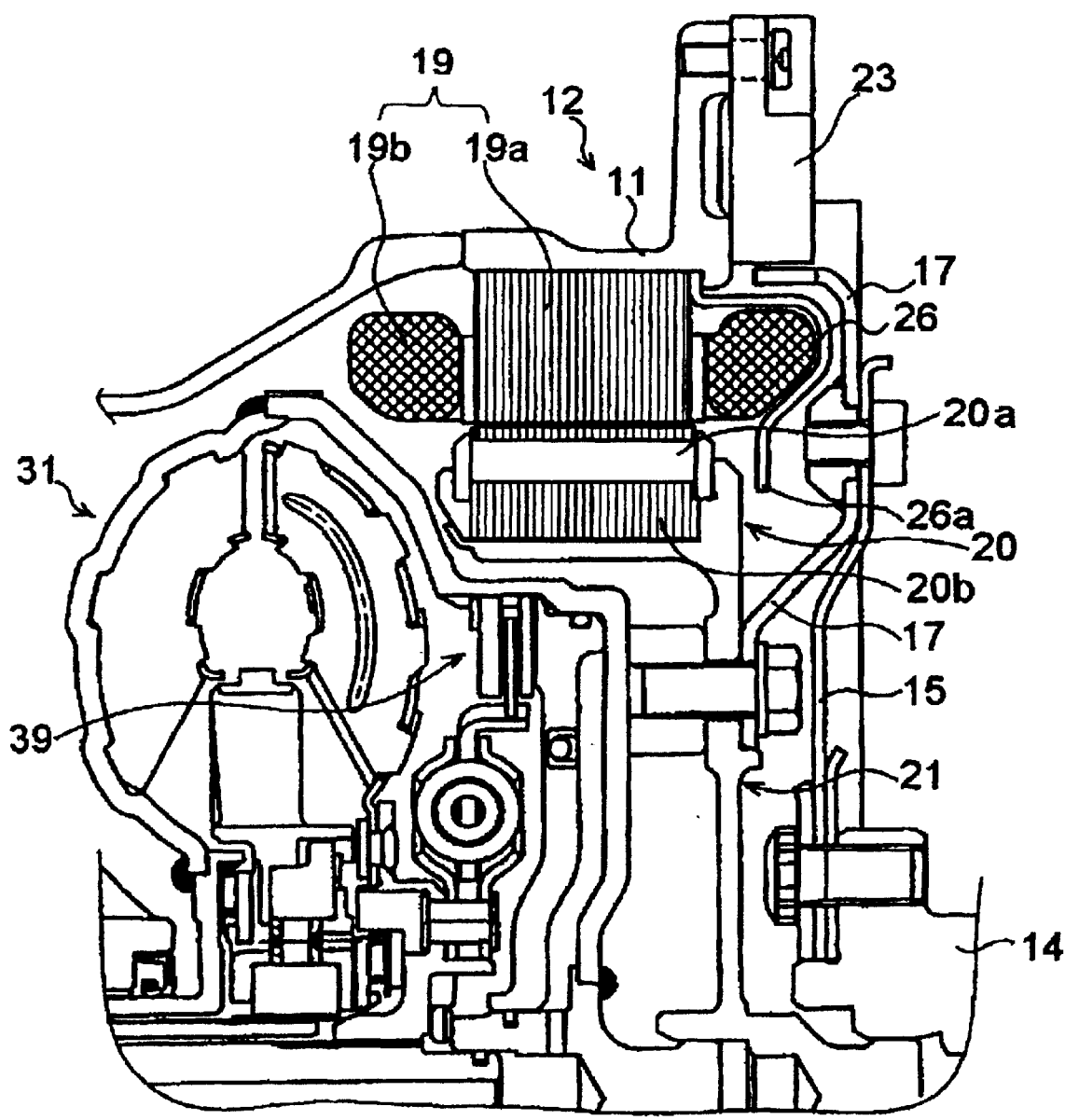
FIG. 5 is a sectional view similar to FIG. 2 but of another embodiment in which a shield member is partially changed.

Next, a partially modified embodiment will be explained with reference to FIG. 5. If the above-described shield plate 26 substantially covers the stator windings 19b to prevent the magnetic flux of the stator coil end from leaking to the sensor, this shield plate 26 suffices. However, if a motor has a rotor in which a permanent magnet is embedded like a brushless DC motor, it is better to shield against magnetic flux leakage from the magnet embedded in the rotor.

In this embodiment, the outer peripheral edge of the shield plate 26 is contactingly fixed to the stator core 19a, and the inner edge 26a of the shield plate 26 extends radially inward over a portion of the right lateral side of the rotor 20 to a point below a permanent magnet 20b embedded in a laminated plate 20a. That is, the shield plate 26 extends axially from the stator core 19a over an outer peripheral side of the stator windings 19b, then radially inward over the right lateral side of the stator windings and further radially inward over the right lateral side portion of the rotor core 20a containing the permanent magnets 20b. With this arrangement, magnetic flux from the permanent magnet of the rotor 20 can also be shielded.

Figure 6:
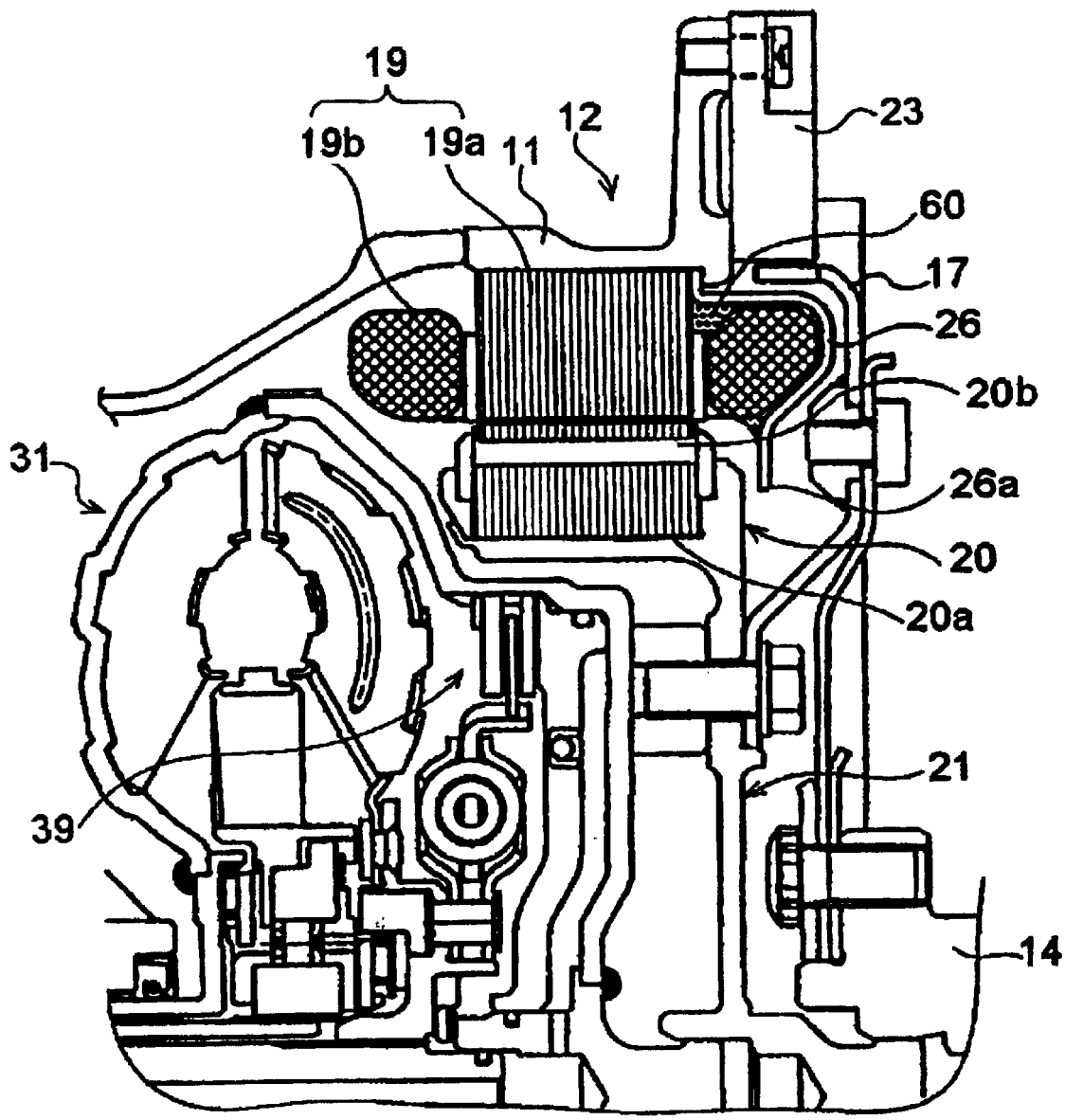
FIG. 6 is a sectional view similar to FIG. 2 but of still another embodiment in which the shield member is further partially changed.

FIG. 6 shows a further modified embodiment. Like the previous embodiment shown in FIG. 5, a inner edge of the shield plate 26 extends radially inward over a side portion of the rotor 20. A gap (air layer) between the shield plate 26 and the stator winding 19b and the stator core 19a is filled with heat conductive resin 60 such as coil-impregnating varnish. Accordingly, heat (coil heat) from the stator winding 19b is transmitted to the stator core 19a and the housing 11 through the heat conductive resin 60 having higher heat conductivity as compared with the air layer, the heat conductivity is enhanced and as a result, thermal radiation ability of the motor 12 is enhanced. It is preferable that the heat conductive resin be made of non-magnetic material, but even if the resin is made of magnetic material, the shielding effect against the magnetic flux leakage by the shield plate 26 is not impaired at all.

Therefore, according to the present embodiment, even if high current is applied to the stator winding 19b, a sensor position at which error due to a magnetic effect is not caused can be obtained, and a compact motor (dynamo) having excellent thermal radiation ability can be realized. The heat conductive resin 60 can be filled not only into the shield plate 26 having the tip end 26a extended to the side portion of the rotor, but also to the shield plate 26 extended to the radially inner peripheral end of the stator windings 19b of course.

Referring back to FIG. 1, the automatic transmission 13 includes a multi-stage transmission mechanism 30 and a torque converter 31. The multi-stage transmission mechanism 30 is accommodated in a transmission case 32. The multi-stage transmission mechanism 30 comprises a main transmission mechanism 34 disposed coaxially with an input shaft 33 (FIG. 2), an auxiliary transmission mechanism 36 coaxially disposed with a counter shaft 35 which is substantially in parallel to the input shaft 33, and a differential apparatus 37 disposed coaxially with a front drive shaft of the vehicle. The torque converter 31 is accommodated in a converter housing 38, and includes a lock-up clutch 39, a turbine runner 40, a pump impeller 41, a stator 42, and a front cover 43 disposed such as to cover these members. A center piece 44 is fixed to a rotation center of the front cover 43, FIG. 2.

The front cover 43 comprises a disc-like inner diameter portion 43a disposed along a disc 21b of the rotor 20, a cylindrical intermediate portion 43b connected to an outer edge of the inner diameter portion 43a and disposed along the retaining portion 21c, and an outer diameter portion 43c formed such as to extend along the outside shape of the turbine runner 40 and fixed to the pump impeller 41 (see FIG. 2).

The center piece 44 is inserted into a shaft 21a of the rotor 20 relatively movably therewith in the axial direction, and the rotor 20 is centered with respect to the torque converter 31. An outer shell of the torque converter 31 is deformed by change in centrifugal hydraulic pressure and charge pressure. The deformation amount in the axial direction on the rotation center side is large. Therefore, the center piece 44 moves in the axial direction, but since the center piece 44 and the shaft 21a of the rotor 20 are axially relatively movably supported, even if the center piece 44 is moved in the axial direction, the supporting precision of the rotor 20 is not affected.

Further, in the rotor 20, the disc 21b of the rotor supporting plate 21 is fixed to an inner diameter portion 43a by means of a bolt 22 and a nut 25. Therefore, a portion of the torque converter 31 closer to its rotation center is largely deformed, and a portion of the torque converter 31 closer to an outer diameter side of the front cover 43 is not largely deformed. Therefore, the support precision of the rotor 20 is not affected by deformation of the torque converter 31.

The lock-up clutch 39 is accommodated and disposed on the inner diameter side of the intermediate portion 43b of the front cover 43. The intermediate portion 43b is formed with splines in the axial direction. A plurality of outer friction plates 47 are supported by the splines, and the outer friction plates 47 are prevented from falling out by means of a snap ring 48. A piston plate 45 is disposed between an inner peripheral surface of the intermediate portion 43b and an outer peripheral surface of the center piece 44. A hub 49 is spline-connected to the input shaft 33, and a hub 50 is supported. The hub 50 extends toward the rotor 20 in the axial direction. A plurality of inner friction plates 51 are spline-connected. These outer friction plates 47 and inner friction plates 51 constitute a multi plate disk clutch. A diameter of the lock-up clutch 39 is smaller than that of a torus comprising the turbine runner 40 of the torque converter 31 and the outer shell of the pump impeller 41.

An oil pump 46 is disposed between the torque converter 31 and the multi-stage transmission mechanism 30 on the left side of the torque converter 31. A pump case 46a of the oil pump 46 is fixed to the transmission case 32. A hub 41a of the pump impeller 41 is rotatably supported on an inner peripheral surface of the pump case 46a.

Next, the operation of a hybrid vehicle driving apparatus to which the present invention is applied will be explained briefly.

When the vehicle is at a stop, if a driver turns a key switch ON and steps on an accelerator pedal, current flows from a battery to the motor 12, and the motor 12 functions as a motor. That is, when the controller supplies current to the stator windings 19b of the stator 19 at an appropriate timing based on a signal (rotational position of the rotor 20) from the position sensor 23, the rotor 20 rotates, and its rotation drive force is transmitted from the rotor supporting plate 21 to the torque converter 31, and the force is amplified to a predetermined torque ratio by the torque converter 31 and transmitted to the input shaft 33.

At vehicle take-off, the internal combustion engine is in its stop state, and the vehicle starts only by a driving force from the motor 12. Since the rotor supporting plate 21 rotates by rotation of the rotor 20, the engine crankshaft 14 is rotated through the detection plate 17 and the drive plate 15 and as a result, the piston reciprocates while repeating compression and releasing operations of air in the cylinder chamber. The motor 12 has characteristics to output high torque during low-speed rotation. The increase in torque ratio of the torque converter 31 together with the high torque ratio obtained by the first gear of the multi-stage transmission, starts the vehicle.

When the accelerator pedal is stepped and the throttle opens to a given opening or greater, the fuel injection apparatus is actuated, the motor 12 functions as a starter motor, and the ignition plug is ignited to start the internal combustion engine. With this operation, the engine crankshaft 14 rotates, and the rotation drive force is transmitted to the rotor supporting plate 21 through the drive plate 15 and the detection plate 17. Driving forces of both the internal combustion engine and the motor 12 are combined to be transmitted to the torque converter 31, and the forces are and the vehicle runs with a large driving force.

When the vehicle runs steady at high speed, current supply to the motor 12 is cut off and the circuit is opened to let the motor 12 idle, and the vehicle runs entirely by the driving force of the internal combustion engine. In this state driven by the internal combustion engine, if the direction of converter pressure is switched, the piston plate 45 is moved to connect the lock-up clutch 39. With this operation, the torque transmitted to the front cover 43 is directly transmitted to the input shaft 33.

If output of the internal combustion engine is sufficient when the vehicle runs steady at low speed or runs downhill, the motor 12 is allowed to function as a dynamo to charge the battery. Especially when engine brake is necessary during hill descent, regenerative power of the motor 12 functioning as the dynamo is increased, and sufficient engine brake effect can be obtained. At the time of braking, the regenerative power of the dynamo is further increased, and the motor 12 functions as a regenerative braking system.

On the other hand, when the vehicle stops due to a signal or the like, the motor 12 is stopped, the fuel injection apparatus is turned off, and the internal combustion engine is stopped. In this manner, the conventional idling state is eliminated.

Japanese patent applications H11-359987 filed Dec. 17, 1999 and 2000-172492 filed Jun. 8, 2000 are hereby incorporated herein in their entirety.

We claim:

1. A motor, comprising:

a housing formed of a non-magnetic material;

a cylindrical rotor, a stator arranged facing and at a predetermined distance from a peripheral surface of said rotor, said stator including a stator core and a plurality of stator windings arranged along a circumferential direction of said stator core at substantially equal distances from one another, a position sensor, mounted on said housing, for detecting a rotational position of said rotor, and a shield member formed of a magnetic material, mounted directly on said stator core and positioned to shield said position sensor from magnetic flux leakage from said stator windings.

2. A motor according to claim 1, wherein said shield member is disposed so as to extend around said stator windings on all sides facing said position sensor.

3. A motor according to cl aim 1, wherein said position sensor comprises a magnetic sensor, and said position sensor is disposed close to the outer periphery of said stator windings in a radial direction thereof.

4. A motor according to claim 1, wherein said position sensor detects the rotational position of said rotor through a position indicating member extending integrally from said rotor radially outward.

5. A motor according to claim 4, wherein said position indicating member extends radially outward to an outer peripheral side of the stator and the shield member.

6. A motor according to claim 5, wherein said position indicating member has a radial outer portion bent over said stator windings toward said stator core, a plurality of detection teeth formed on the bent portion along a circumferential direction thereof, and a detection portion of said position sensor opposed to said detection teeth detects a rotational position of said rotor.

7. A motor according to claim 4, wherein said position indicating member has a radial outer portion bent over an outer peripheral portion of said stator windings, a plurality of detection teeth formed on the bent portion along a circumferential direction thereof, and a detection portion of said position sensor opposed to said detection teeth detects a rotational position of said rotor.

8. A motor according to claim 1, wherein said stator core and said shield member are integrally fastened to a motor housing which accommodates said rotor and said stator.

9. A motor according to claim 1, wherein said shield member extends axially from said stator core over an outer peripheral side of said stator windings and then radially inward over a lateral side of said stator windings to a radially inner side of said stator windings.

10. A motor according to claim 9, wherein a radial inner portion of said shield member extends axially toward said stator core over a radial inner portion of the stator windings.

11. A motor according to claim 1, wherein said shield member extends axially from said stator core over an outer peripheral side of said stator windings and then extends radially inward over a lateral side of said stator windings and over a lateral side portion of said rotor.

12. A motor according to claim 1, wherein said shield member is formed from a ferromagnetic material.

13. A motor according to claim 4, wherein a distance between said stator core and said shield member is set shorter than a distance between said stator core and said position indicating member.

14. A motor according to claim 1, wherein a heat conductive member is filled between said stator core, said stator windings and said shield member.

15. A motor according to claim 1, wherein said motor is applied to a hybrid vehicle driving apparatus.

16. A motor according to claim 1 wherein said stator is arranged radially outward of said rotor and said peripheral surface is an outer peripheral surface of said rotor.

17. A motor according to claim 1 wherein said position sensor is arranged radially outward of said rotor.

18. A motor according to claim 17 further comprising a detection member which rotates with said rotor and extends radially outward of said rotor, to a position between said rotor and said position sensor, said position sensor detecting the rotational position of said rotor by monitoring said detection member.

19. A motor according to claim 1 wherein said position sensor is mounted radially outward of said stator windings and said shield member is disposed between said position sensor and said stator windings.

* * * * *